United States Patent [19]

Jackson et al.

[11] 4,258,629
[45] Mar. 31, 1981

[54] BRAKING AND STEERING RADIAL TRUCK

[75] Inventors: Keith L. Jackson, Granite City; James J. Reece, Belleville; Kenneth E. Spencer, Granite City, all of Ill.

[73] Assignee: General Steel Industries, Inc., St. Louis, Mo.

[21] Appl. No.: 72,474

[22] Filed: Sep. 4, 1979

[51] Int. Cl.³ .......................... B61F 5/10; B61F 5/16; B61F 5/38; B61H 13/24
[52] U.S. Cl. ............................. 105/167; 105/182 R; 105/199 R; 105/224.1; 188/58
[58] Field of Search .................. 105/168, 182 R, 176, 105/199 R, 200, 224.1, 167; 188/58, 59, 70, 72.9

[56] References Cited

U.S. PATENT DOCUMENTS

| 2,284,484 | 5/1942 | Eksergian | 188/59 |
|---|---|---|---|
| 2,286,563 | 6/1942 | Mussey | 105/224.1 |
| 2,352,222 | 6/1944 | Pogue et al. | 188/59 X |
| 3,314,505 | 4/1967 | Pelikan | 188/72.9 X |
| 3,315,555 | 4/1967 | Travilla | 105/200 X |
| 3,344,893 | 10/1967 | Pelikan | 188/58 |
| 3,913,495 | 10/1975 | Pelabon | 105/199 R |
| 4,067,261 | 1/1978 | Scheffel | 105/224.1 X |
| 4,067,262 | 1/1978 | Scheffel | 105/224.1 X |
| 4,111,131 | 9/1978 | Bullock | 105/224.1 |
| 4,131,069 | 12/1978 | List | 105/224.1 X |
| 4,134,343 | 1/1979 | Jackson | 105/224.1 X |
| 4,136,620 | 1/1979 | Scheffel et al. | 105/224.1 X |
| 4,151,801 | 5/1979 | Scheffel et al. | 105/224.1 X |

Primary Examiner—Howard Beltran
Attorney, Agent, or Firm—F. Travers Burgess

[57] ABSTRACT

A radial axle railway truck of the rigid frame type has an improved primary suspension for resiliently supporting the truck frame from the axles while permitting arcuate movements of the ends of the axles required to allow the axles to assume radial positions on curved track and an improved disc brake system arranged to minimize interference with wheel-induced steering movements of the axles. The primary suspension comprises journal bearing structures with fore and aft wings, a yoke supported on the wings by flat elastomeric pads yieldable horizontally to accommodate steering movements of the axles and chevron-shaped elastomeric springs carried on the yokes fore and aft of the respective journal boxes and acting in parallel with metal coil springs carried by the yokes. A disc brake system has a single disc at the center of each axle, with underslung brake shoes and the reaction connections of the shoes to the truck frame being substantially horizontal to counter the effect of retardation forces between the respective axle and the truck frame.

13 Claims, 6 Drawing Figures

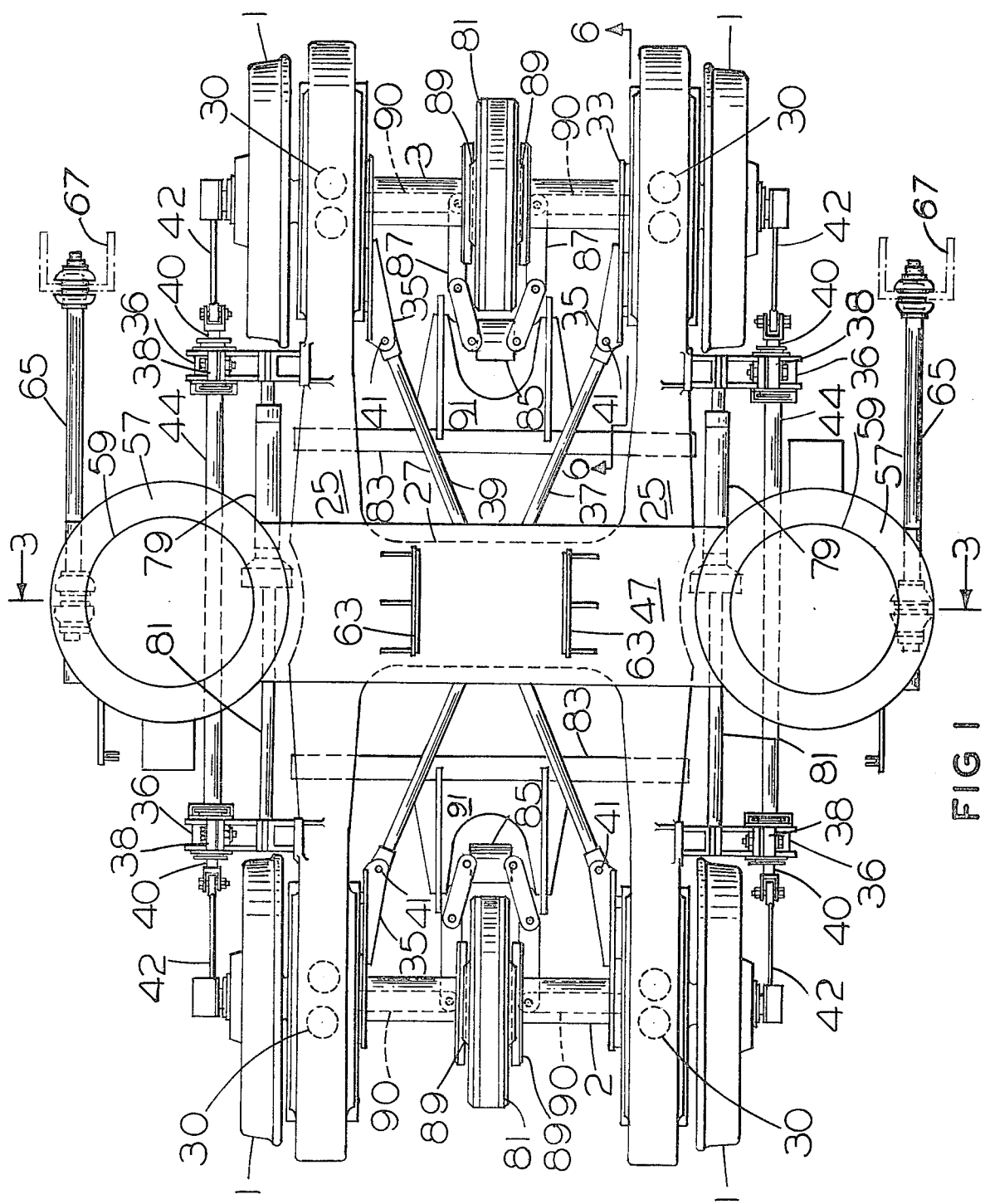

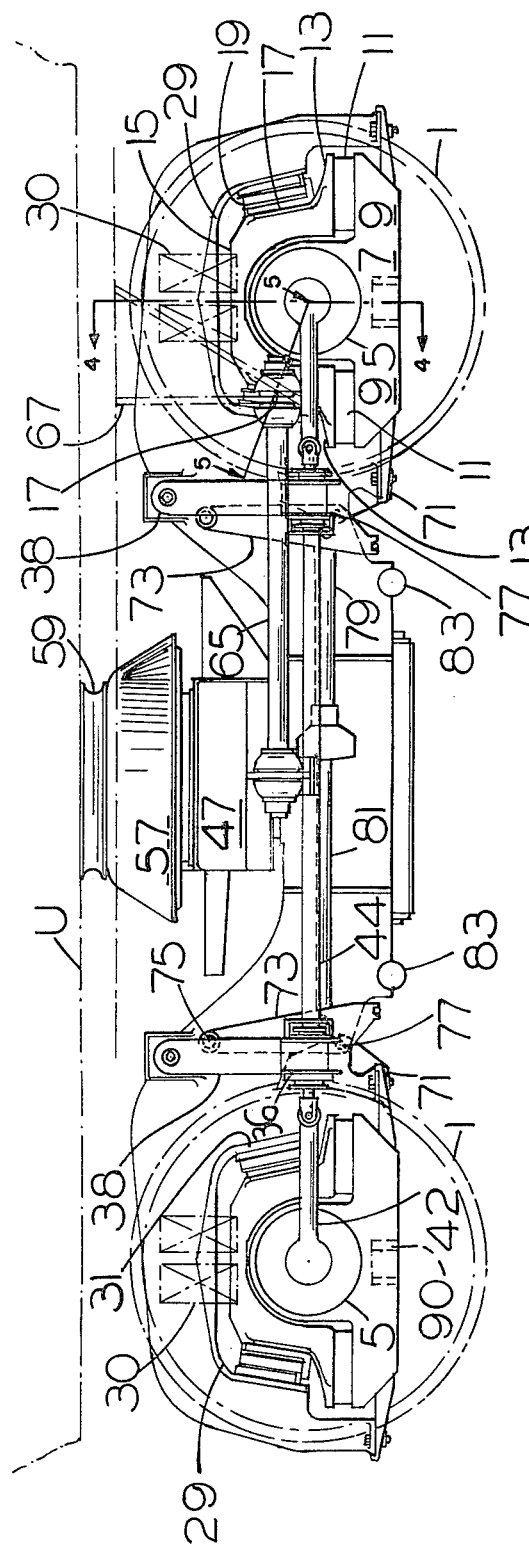

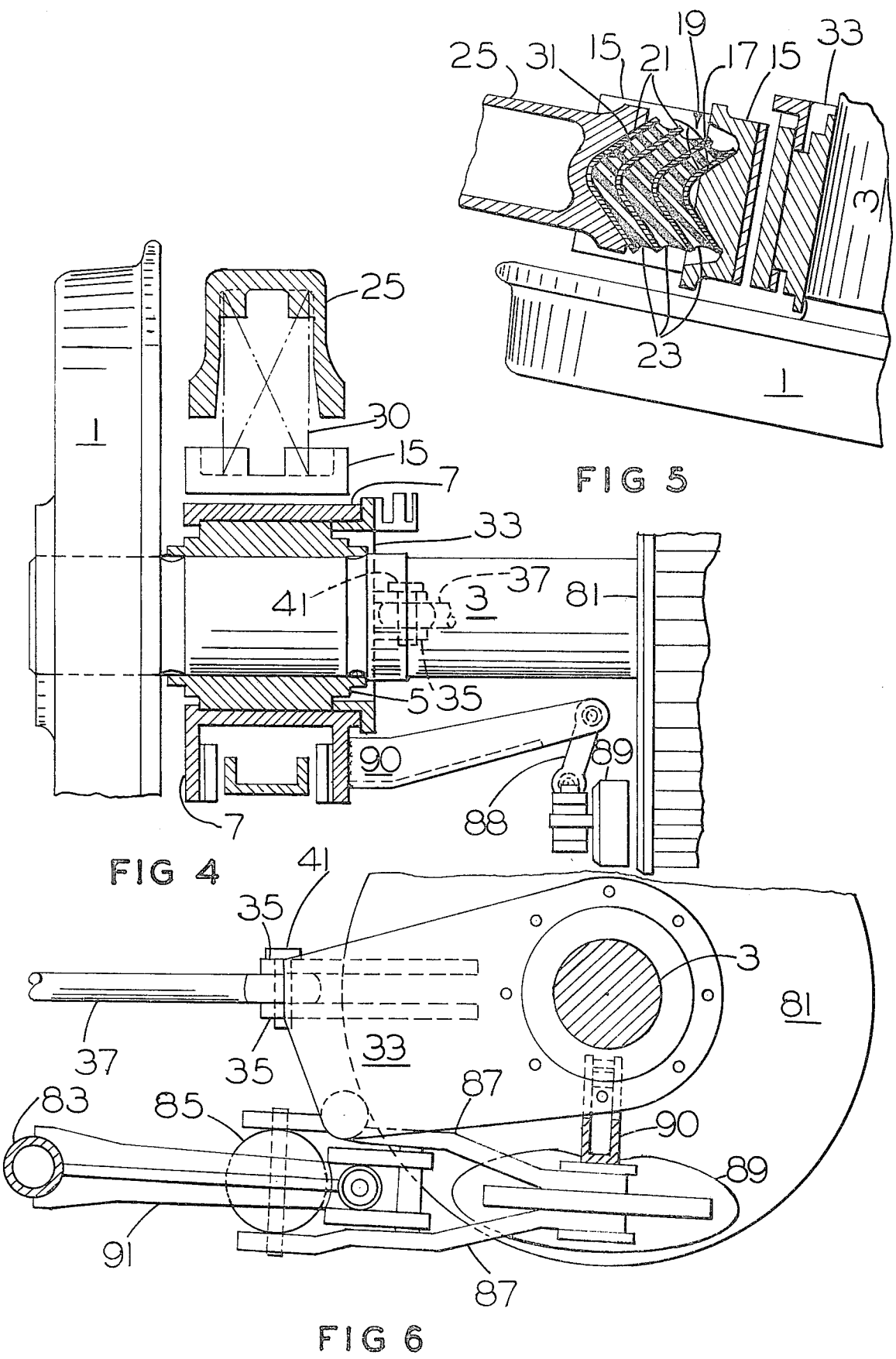

BRAKING AND STEERING RADIAL TRUCK

BACKGROUND OF THE INVENTION

1. Field of the Invention

The invention relates to railway rolling stock and consists particularly in a radial axle rigid-frame truck with an improved primary suspension and a compatible disc brake system.

2. The Prior Art

Herbert Scheffel U.S. Pat. Nos. 4,067,261, 4,067,262 and 4,136,620; Robert L. Bullock Pat. No. 4,111,131 and Harold A. List U.S. Pat. No. 4,131,069, like the truck of this application, all utilize flat horizontally elastomeric pad devices which are yieldable in shear, in the support of the truck framing from the axles, to permit radial movements of the axles. However, each of these patented trucks, unlike the trucks of this application, are of the separate side frame type in which load equalization is provided by tipping of the side frames relative to each other in their respective longitudinal vertical planes, and the side frames are mounted on the axle bearings without a primary vertically resilient suspension but simply by means permitting horizontal movements of the axle bearings with respect to the side frames as are required by steering.

In Keith L. Jackson U.S. Pat. No. 4,134,343 radial trucks of the rigid frame type are disclosed in which the rigid truck frame is supported from the axle bearings by means of resilient devices yieldable both vertically to permit the axles to accommodate to vertical track irregularities and horizontally to permit steering movements of the axles between positions transverse of the truck on tangent track and positions radial of the track on curved track. In one embodiment disclosed in this patent, sloping-side adapters mounted on the axle bearings supported relatively flat chevron-shaped elastomeric springs which in turn supported a yoke which mounted horizontal rubber pads in turn supporting the truck frame, vertical and transverse movements of the axle boxes being accommodated through shear in the chevron devices and longitudinal movements of the axle ends being accommodated mainly through longitudinal shear in the horizontal pads supporting the truck frame from the yokes. In a second embodiment in this patent, the axle box adapters supported spring assemblies consisting of elastomeric pads and coil springs in series supporting the truck frame, such that vertical movements of the axle bearings with respect to the truck frame would be accommodated principally by compression in the coil springs and longitudinal and lateral movements necessary for steering of the axles would be accommodated chiefly through longitudinal and lateral shear in the elastomeric pads. In a third form of the invention disclosed in this patent, the axle boxes mounted an adapter by means of an annular elastomeric grommet to provide necessary lateral movement of the axles with respect to the truck frame through lateral shear in the grommet and the adapters in turn supported the truck frame through relatively acute-angle chevron-shaped elastomeric spring devices designed to permit sufficient longitudinal movement of the axle bearings with respect to the truck frame by reason of the low longitudinal rate of the acute-angle chevron devices which would resist substantial lateral movements of the axle bearings with respect to the truck frame by reason of the relatively high lateral rate of the acute angle chevron devices. A subsequent application of K. L. Jackson, W. C. Jones and K. E. Spencer, Ser. No. 936,211, filed Aug. 24, 1978, disclosed an arrangement in which a single centrally disposed brake disc was mounted on each axle with the disc brake operating mechanisms supported from the axle bearing adapters which, in turn, supported chevron elastomeric spring devices of relatively acute angular shape and upright coil springs to support the truck frame. In this arrangement the effect of the disc brake application on the axle bearing adapters was to rotate the adapters in the same direction as the axles were rotating but by having the compression axes of the chevron spring devices converge below the axle center, the retardation effect on the adapters would counter the effect of the disc brake application and tend to maintain the adapters in a stable upright position.

SUMMARY OF THE INVENTION

The invention provides a radial axle railway truck having self-steering axles and a rigid frame resiliently supported thereon by means of a horizontally and vertically yieldable suspension which freely accommodates steering movements of the axles and eliminates any overturning moment on the axle bearings as a result of longitudinal forces, and a single disc brake arrangement at the center of each axle constructed to counter the effect of retardational forces between the axle bearings and truck frame, whereby to minimize interference with the steering movements of the respective axles.

Objects of the invention accordingly include the following:

The provision in a radial axle truck of the rigid frame type, of a primary suspension which substantially eliminates overturning moments on the journal bearings resulting from longitudinal forces; the provision of a disc brake arrangement for a radial axle truck arranged to minimize interference with the steering capability of the respective axles; the provision of a disc brake arrangement for radial axle trucks offering minimal interference with and minimal resistance to steering movements of the respective axles; the provision of a disc brake arrangement which counters the effect of retardational forces between the truck frame and axle bearings by having the brake shoes engage the single central disc on each axle below rather than beside the respective axle and having the brake reaction connection from the shoes to truck frame substantially aligned longitudinally and horizontally with the respective brake shoes.

BRIEF DESCRIPTION OF THE DRAWINGS

FIG. 1 is a top view of a truck with its brake arrangement constructed in accordance with the invention.

FIG. 2 is a side elevational view of the truck illustrated in FIG. 1.

FIG. 3 is a transverse vertical sectional view taken along line 3—3 of FIG. 1.

FIG. 4 is a longitudinal vertical sectional view taken along line 4—4 of FIG. 2.

FIG. 5 is a fragmentary inclined sectional view taken along line 5—5 of FIG. 2.

FIG. 6 is a fragmentary vertical sectional view taken along line 6—6 of FIG. 1 showing the disc brake mechanism.

DETAILED DESCRIPTION OF THE INVENTION

The truck illustrated in the drawings has a pair of spaced wheel and axle assemblies, each comprising railway flanged wheels 1 mounted in gauged pairs on the ends of the respective axles 2 and 3. The effective conicity of the wheel tread profile is sufficient to effect self-steering of each wheel and axle assembly by means of the differential effect between the wheel diameters of the outer and inner wheels on curved track and is substantially greater than the standard conicity of 1:20 or 0.05, preferably being between 1:10 and 1.5.

Inboard of the wheels, each of the axles 2 and 3 mounts, adjacent the respective wheels, journal bearing structures each comprising a journal bearing 5 and an adapter 7, the bottom of which is extended fore and aft from journal bearing 5 to form a pair of horizontal upwardly facing wings 9. A flat elastomeric pad 11 is seated on each wing 9 and supports downwardly facing surfaces of terminals 13 of a yoke 15 which overlies adapter 7 and is formed with fore and aft transverse surfaces 17 sloping inwardly from the ends of the yoke, i.e., toward the vertical central plane through the axis of the respective axles. In plan, surfaces 17 are of right-angle shape with their apices pointing away from the axle bearing 5 in a direction longitudinally of the truck. Each surface 17 mounts a V-shaped elastomeric pad device 19 comprising a plurality of metal plates 21 of V-shape between which are positioned elastomeric pads 23 bonded to the adjacent plates.

A rigid truck frame, comprising longitudinally extending transversely spaced side members 25 positioned generally transversely inwardly of wheels 1 and connected by a central transverse transom 27, is formed at the ends of each side member with downwardly open pedestal jaws 29, the inner fore and aft surfaces 31 of which are of concave V-shape in plan and slope parallel to the journal bearing yoke surfaces 17 to receive the outermost plates 21 of elastomeric pad devices 19, such that vertical cushioning movements of the truck frame with respect to yokes 15 are accommodated and yieldingly resisted by shear and compression in the elastomeric pads 23, substantial lateral and longitudinal movements of the yokes 15 with respect to the truck frame being resisted by the resistance to compression of the elastomeric pads 23. The upper horizontal portion of each pedestal jaw 29 is of downwardly open channel shape and receives upright coil springs 30 seated on the tops of yokes 15. Coil springs 30 act in parallel with elastomeric pad devices 19 to support and cushion the vertical load of the truck frame. At the same time, substantial turning movements of the respective axles 2 and 3 in the horizontal plane are accommodated and yieldingly resisted by shear in horizontal elastomeric pads 11 by which yokes 15 are supported on wings 9 of axle box adapters 7. The resistance offered by elastomeric pads 11 to turning movements of the axles in the horizontal plane is substantially less than the steering forces generated by the wheel treads on curved track. The axles are thereby capable of assuming radial positions during operation on curved track and will be assisted in returning to their normal parallel positions upon entering tangent track by the resiliency in shear of elastomeric pads 11.

It will be noted that the slope of elastomeric pad devices 19 is such that their resultant dynamic force lines, shown in broken lines, intersect substantially at the centers of the respective axles so that when longitudinal forces act in opposite directions on the truck frame and axles, as when the brakes are applied, and the wheels decelerate and the pad devices 19 on the trailing side of the axle are subject to additional compression and those on the leading side of the axle are correspondingly relieved, no overturning movement will be applied to the yokes, adaptors and journal bearings, which will thus be stabilized against tilting, thus maintaining links 37 and 39 level and substantially co-planar with the axes of the axles.

Inwardly of the frame side members 25, clevis support plates 33 are secured to the inner surfaces of the journal bearing housings 5 and are formed longitudinally of the truck inwardly therefrom with clevises 35. Diagonally extending rods 37 and 39 are pivotally connected to clevises 35 by pins 41 such that the projections of the axes of rods 37 and 39 intersect the centers of the axle journal whereby, when the axles turn in the horizontal plane, their turning movements will be equal and in opposite senses. It will be noted that truck frame transom 27 is centrally apertured at 43 to permit the passage therethrough of rods 37 and 39 without interfering with the relative movements of rods 37 and 39.

For damping yawing movements of the axles and thus assisting in the elimination of axle hunting, separate snubber assemblies at each side comprise snubbers having fixed parts 36 supported by links 38 from the truck frame side members longitudinally inwardly from the wheels, with their longitudinally movable plungers 40 connected by longitudinal links 42 to the ends of the respective axles 2 and 3 and the snubber fixed parts at each side connected to each other by a longitudinally extending horizontal rod 44.

For supporting the car underframe U on the truck, a transversely extending bolster 47 is formed at its center with a downwardly open cylindrical recess 49 which mates with an upstanding cylindrical boss 51 on truck frame transom 27 to provide a pivot center for swiveling movements of the truck frame relative to bolster 47, bolster 47 being supported on side members 25 of the truck frame by downwardly facing side bearing members 53 slidably engaging upwardly facing side bearing members 55 on the truck frame side members 25. This arrangement of bolster recess 49 and pivot boss 51 leaves the interior of the truck frame transom 27 unobstructed to provide clearance for the passage therethrough of rods 37 and 39. The end portions of bolster 47 outboard of the truck frame side members 25 support laterally and vertically yieldable air springs 57 to the top of each of which is secured an elastomeric sandwich 59 on which underframe U is seated, vertical cushioning of the underframe U being provided by the resiliency of pneumatic springs 57 and lateral movements of the underframe with respect to the truck being provided and yieldingly resisted by lateral shear in air springs 57 and in elastomeric sandwiches 59. For limiting lateral movements of underframe U with respect to the truck, underframe U mounts at its center a pair of outwardly facing elastomeric bumper devices 41 which are engageable with upstanding lateral stop abutments 63 on truck bolster 47 as the limits of lateral movement of the underframe with respect to the truck are approached. For transmitting traction forces between truck bolster 47 and underframe U while accommodating relative vertical and lateral movements of the underframe on the truck, longitudinally extending anchors 65, preferably of the type disclosed in J. C. Travilla U.S. Pat. No.

3,315,555, are pivotally connected at one end to bolster 47 and at their other end to brackets 67 depending from the sides of underframe U.

With the arrangement described above, as a car equipped with a pair of trucks constructed in accordance with the invention proceeds along tangent track, any tendencies of either of the axles to turn in the horizontal plane will be opposed by the diagonal cross connection between the axles and yieldingly resisted by the resistance to shear of horizontal pad devices 11 associated with each journal bearing. As the car enters curved trackage and centrifugal forces urging the car structure outwardly cause the outer wheels to ride on a larger diameter than the inner wheels, the axles will be steered to a position radial of the track, such steering being accommodated by the diagonal cross connections between the axles through which the axles are permitted to turn equally in opposite senses in the horizontal plane. At the same time, V-shaped elastomeric pad devices 19, through their yieldability in shear and compression, permit the individual wheels to move vertically relative to the truck frame and to each other to accommodate vertical irregularities in the track structure while the resistance of the pad devices 19 principally to compression transversely and longitudinally of the truck prevent lateral and longitudinal movements of yokes 15 relative to the truck frame side members 25, such movements as are necessary for steering of the individual axles being accommodated by yielding in shear of horizontal pads 11. By having the compression axes of pad devices 19 intersect substantially at the centers of the respective axles 2 and 3, longitudinal forces applied through pad devices 19 between the truck frame side members 25 and yokes 15 will apply no rotational moment to the respective yokes 15, and through yokes 15 and horizontal pads 11, to the axle box adapters 7 on which the yokes are supported by horizontal pads 11.

The truck is provided with a dual brake system comprising tread and disc brakes constructed for compatibility with steering movements of the axles and to minimize interference with any such wheel-induced steering movements.

The tread brakes consist essentially of brake heads 70 with shoes 71 engageable with the wheels at each side and suspended by substantially upright levers 73 fulcrumed on truck frame side members 25 at 75 and pivotally connected to the brake heads 70 at 77. The pair of levers at each side of the truck is connected to each other by an extensible rod comprising a hydraulic cylinder 79 and its piston rod 81, the cylinders 79 at opposite sides of the trucks being cross-connected so that when hydraulic fluid is forced into the system, the lengths of rods 79 and 81 will adjust automatically to conform to the relative spacing of the wheels at each side, irrespective of whether the truck is on tangent track in which the wheels at both sides are equally spaced from each other or on curved track in which the inner wheels are more closely spaced than the outer wheels. Preferably, the hydraulic interconnection between the tread brake mechanisms at opposite sides of the truck is similar to that disclosed in Keith L. Jackson U.S. Pat. No. 4,134,343.

In order to cause the disc brake shoe forces to counter retardational forces between the axle and truck frame, disc brake shoes 89 are hung by links 88 from inwardly extending brackets 90 on journal box adapters 7, such that the brake shoes 89 are engageable with the respective discs 81 below the axes of the respective axles rather than fore or aft of the axle as with typical disc brake arrangements. The disc brake cylinder 85 and calipers 87 are connected to the truck frame by a brake reaction structure 91 which extends longitudinally of the truck at the same level as the shoes 89 and is connected to the truck frame side members by a transverse tube 83. With this arrangement, it will be seen that the braking torque reaction, because of its horizontal, longitudinal transmission to the truck frame opposes any tendency of the truck frame to move longitudinally with respect to the axle, its journal boxes and the respective adapters 7 as a result of the application of braking forces to the disc.

From the foregoing, it will be evident that the V-shaped elastomeric pad devices 19, by eliminating any overturning moment on the yoke resulting from longitudinal forces, cooperate with the effect of the longitudinally acting disc brake shoe forces to counter the effect of retardation forces between the yoke and journal box adaptors 7 and the truck frame, so as to minimize the effect of longitudinal forces to apply excessive strain to horizontal pad devices 11.

Operation of the truck is as follows: During acceleration of a car equipped with the trucks of the invention, as the acceleration forces are transmitted from the truck frame to the axles through chevron springs 19, no overturning moments are applied by these longitudinal forces to the journal bearing yokes 15 because of the intersection of the resultant dynamic forces at axle center line. Although horizontal elastomeric pad devices 11 permit and yieldingly resist axle yaw, the diagonal interconnections 37 and 39 between the axles cause the axles to oscillate out of phase with each other and with the truck frame, thereby damping any hunting oscillations. Additional yaw damping is provided by the floating damping assemblies 36, 44 at each side, which because of their free suspension via links 38 from the truck frame and their longitudinal interconnection by rods 44 act solely between the axles rather than between the respective axles and the truck frame.

When a brake application is made, by reason of the location of the brake shoes below, rather than beside, discs 81, the brake reactions act longitudinally rather than vertically, and since the position of the shoes is fixed longitudinally of the truck frame by the connection thereto of disc brake reaction structure 91, 83, substantial relative longitudinal movement between the truck frame and axles as a result of retardational forces is prevented.

Because of this, during braking horizontal elastomeric pad devices 11 will not be deflected in shear, nor will the chevron springs 19 be deflected longitudinally, and the pad devices will provide only their normal resistance to yawing, including steering movements of the respective axles.

The details of the truck described herein, including details of the primary suspension of the truck frame on the axles, and of the construction and arrangement of the disc brake may be varied substantially without departing from the spirit of the invention, and the exclusive use of such modifications as come within the scope of the appended claims is contemplated.

We claim:

1. In a railway truck, a pair of wheel and axle assemblies each comprising an axle and a pair of railway wheels rigidly mounted on the ends thereof, journal bearing structure including journal bearings on the end portions of each axle and having upwardly facing surfaces fore and aft of the respective bearing and at a substantially lower level than the top of the respective bearing structure mounting flat horizontal elastomeric pad devices, and a yoke embracing each said journal bearing structure and having downwardly facing surfaces carried by said horizontal pad devices on the respective journal bearing structure and having fore and aft surfaces sloping upwardly towards each other and mounting correspondingly sloping elastomeric pad devices, a truck frame having longitudinal side members with downwardly open jaws embracing the respective yokes and having their opposite fore and aft surfaces corresponding in slope with the surfaces of said yokes and resting on said sloping pad devices whereby said truck frame is vertically resiliently supported on said yokes and said yokes are held against substantial longitudinal movement by the resistance of said sloping pad devices to compression longitudinally of the truck, said sloping pad devices being arranged so that the resultant dynamic force lines through them intersect substantially at the center lines of the respective axles whereby to prevent the application to said yokes of overturning moments caused by longitudinal forces, said horizontal pad devices being yieldable in shear to permit said axles to pivot about vertical axes between positions transverse of the truck on tangent track and radial of the track on curved track.

2. In a railway truck according to claim 1, said fore and aft yoke surfaces, said sloping elastomeric pad devices and said pedestal jaw surfaces being of substantially V-shape in plan with their apices pointing in opposite directions longitudinally of the truck from the respective axles.

3. In a railway truck according to claim 1, each said journal bearing structure including an adapter fixedly supported on each said journal bearing, said upwardly facing surfaces being formed on the respective adapters.

4. In a railway truck according to claim 1, helical metal springs seated on each said yoke and supplementing the support of said truck frame by the respective sloping pad devices.

5. In a railway truck according to claim 1, clevis structures secured on said journal bearing structure and diagonal rods pivotally connected to said clevis structures on respectively diagonally opposite journal bearing structures.

6. In a railway truck according to claim 5, said diagonal rods lying substantially in the horizontal plane of the axes of said axles.

7. In a railway truck according to claim 6, the axial projections of the respective diagonally extending rods passing through the centers of said journal bearings.

8. In a railway truck according to claims 5, 6, or 7, said transom being formed with central apertures to permit the passage therethrough of said diagonal rods, there being a bolster supported on said truck frame in overlying relation with said transom, said bolster and transom having cooperating swivel bearing structure comprising an upstanding cylindrical boss on the top of said transom and a mating cylindrical recess in the bottom of said bolster, said upstanding boss leaving the interior of said transom clear of obstructions to said diagonal rods.

9. In a railway truck according to claim 1, means for damping yawing movements of the respective axles comprising longitudinally acting separate snubbers each having a fixed part hung from the side members of said truck frame adjacent each axle longitudinally inwardly from the respective axle and each having a longitudinally movable part, longitudinally extending links connected at their respective ends to the respective snubber movable part and to the end portion of the respectively adjacent axle, and a longitudinal force-transmitting member connected at its respective ends to said snubber fixed parts at the respective side of the truck whereby said snubbers react against each other instead of on the truck frame.

10. In a railway truck according to claim 1, a brake disc mounted on each said axle substantially at the center thereof, brake shoes supported from said journal bearing structures and positioned beneath the respective axles on both sides of the discs thereon for selective engagement with the respective discs, means for selectively urging said shoes into frictional engagement with opposite sides of the respective discs, and longitudinally acting force-transmitting elements connecting said shoes to said truck frame substantially at the level of said shoes whereby to oppose the tendency of retardation forces to cause relative longitudinal movement between the truck frame and the respective axles during brake applications.

11. In a railway truck according to claim 10, including brake shoes engageable with opposing surfaces of the treads of said wheels, said brake shoes being suspended from the side members of said truck frame, an extensible member connecting said brake shoes at each side of the truck, each said extensible member comprising a fluid cylinder secured to one of said brake shoes with its piston secured to the other of said brake shoes and a hydraulic interconnection between the cylinders at opposite sides of the truck whereby, when the truck is on curved track, the extensible rods will accommodate to differential longitudinal spacings of the wheels at opposite sides of the truck caused by steering movements of the respective axles, whereby to eliminate interference of said tread brake mechanism with steering movements of the axle.

12. In a railway truck comprising a pair of wheel and axle assemblies each having a pair of railway flanged wheels rigidly mounted on the ends of an axle, journal bearing structure on the end portions of each axle, a truck frame vertically resiliently supported on said journal bearing structures, means mounting said truck frame on said journal bearing structures to permit said axles to pivot a vertical axis between positions transverse of the truck on tangent track and positions substantially radial of the track on curved track, separate snubbers each having a fixed part hung from the side members of said truck frame adjacent each axle longitudinally inwardly from the respective axle and each having a longitudinally movable part extending longitudinally therefrom toward the respective axles, longitudinally extending links connected at their respective ends to the adjacent snubber movable parts and to an end portion of the adjacent axle, and a longitudinal force-transmitting member connecting said snubber fixed parts at each side of the truck to each other, whereby said snubbers react on each other instead of on the truck frame.

13. In a railway truck comprising a pair of wheel and axle assemblies each having a pair of railway wheels rigidly mounted on the ends of an axle, journal bearing structures on the end portions of each axle, a truck frame carried on said journal bearing structures, means mounting said truck frame on said journal bearing structures to permit said axles to pivot a vertical axis between positions transverse of the truck on tangent track and positions substantially radial of the track on curved track, a brake disc mounted on each said axle substantially at the center thereof, brake shoes supported from said journal bearing structures on both sides of each of said discs and positioned beneath the respective axles for selective engagement, means for urging said shoes into frictional engagement with opposite sides of the respective discs, and longitudinally acting force-transmitting structure connecting said shoes to said truck frame at substantially the level of said shoes, whereby to oppose the tendency of retardation forces to cause relative longitudinal movement between the respective axles and the truck frame during brake application.

* * * * *